United States Patent
Tremolada et al.

(10) Patent No.: US 12,551,507 B2
(45) Date of Patent: Feb. 17, 2026

(54) FAT AND MEDICAL USES THEREOF

(71) Applicant: LIPOGEMS INTERNATIONAL S.P.A., Milan (IT)

(72) Inventors: Carlo Ferdinando Maria Tremolada, Milan (IT); Pierre Rocheteau, Paris (FR)

(73) Assignee: LIPOGEMS INTERNATIONAL S.P.A., Milan (IT)

( * ) Notice: Subject to any disclaimer, the term of this patent is extended or adjusted under 35 U.S.C. 154(b) by 435 days.

(21) Appl. No.: 16/301,374

(22) PCT Filed: May 12, 2017

(86) PCT No.: PCT/IB2017/052792
§ 371 (c)(1),
(2) Date: Nov. 13, 2018

(87) PCT Pub. No.: WO2017/195156
PCT Pub. Date: Nov. 16, 2017

(65) Prior Publication Data
US 2020/0316133 A1  Oct. 8, 2020

(30) Foreign Application Priority Data
May 13, 2016 (IT) .................. 102016000049360

(51) Int. Cl.
| | | |
|---|---|---|
| A61K 35/35 | (2015.01) | |
| A61K 35/28 | (2015.01) | |
| A61P 31/00 | (2006.01) | |
| A61K 9/00 | (2006.01) | |

(52) U.S. Cl.
CPC ............. *A61K 35/35* (2013.01); *A61K 35/28* (2013.01); *A61P 31/00* (2018.01); *A61K 9/0043* (2013.01)

(58) Field of Classification Search
CPC ...... A61K 35/35; A61K 35/28; A61K 9/0043; A61P 31/00
See application file for complete search history.

(56) References Cited

U.S. PATENT DOCUMENTS

2013/0123747 A1* 5/2013 Tremolada ............ A61M 19/00
604/506

FOREIGN PATENT DOCUMENTS

WO  2011/145075 A2  11/2011

OTHER PUBLICATIONS

Messaggio Doctoral Dissertation at the Universita Degli Studi Di Milano, Facolta Di Medicina e Chirurgia, pp. 1-85, 2013). (Year: 2013).*
Rowan (Critical Care, 1-12, 2015), (Year: 2015).*
Canna (Pediatr Clin North Am, 59(2): 329-344, 2012). (Year: 2012).*
Conzalez-Rey (Gut, 58: 929-939, 2009). (Year: 2009).*
Bianchi (Cell Transplantation, vol. 22, pp. 2063-2077, 2013). (Year: 2013).*
Kim (Cell Transplantation, vol. 22, pp. 2063-2077, 2013). (Year: 2013).*
Smith (abstract, 2014). (Year: 2014).*
Kellum (Arch Intern Med, 13; 167(15): 1655-1663, 2007). (Year: 2007).*
Giori et al., Recovery of function in anal incontinence after micro-fragmented fat grafts (Lipogems) injection: two years follow up of the first 5 cases, CellR4 3(2): e1544, p. 1-12 (Year: 2015).*
Wang et al., The cytokine storm and factors determining the sequence and severity of organ dysfunction in multiple organ dysfunction syndrome, American Journal of Emergency Medicine, 26: 711-715. (Year: 2008).*
Bougle et al., Micro-fragmented fat injection reduces sepsis-induced acute inflammatory response in a mouse model, British Journal of Anaesthesia, 2018: 1-11. (Year: 2018).*
Giori et al., Recovery of Function in Anal Incontinence After Micro-Fragmented Fat Graft (Lipogems®) Injection: Two Years Follow Up of the First 5 Cases, CellR4 2015; 3 (2): e1544, p. 1-12. (Year: 2015).*
Bianchi et al., Derivative Highly Enriched in Pericyte-Like Elements by Mild Mechanical Forces From Human Lipoaspirates, Cell Transplantation, 22: 2063-2077, (Year: 2013).*
Cawthorn et al., "Adipose tissue stem cells: the great WAT hope," Trends in Endocrinology and Metabolism 23: 270-277 (2012).
Gonzalez-Rey et al., "Human adult stem cells derived from adipose tissue protect against experimental colitis and sepsis," Gut 58: 929-939 (2009).
Lindroos et al., "The Potential of Adipose Stem Cells in Regenerative Medicine," Stem Cell Rev and Rep 7: 269-291 (2011) (Initially published on-line Sep. 10, 2010).
Messaggio, "Mesenchymal Stem Cells from human adipose tissue: Characterization and Immunomodulatory Properties of Tissue and Cellular Products," Doctoral Dissertation at the Universita Degli Studi Di Milano, Facolta Di Medicina e Chirurgia (2013).

* cited by examiner

*Primary Examiner* — Arthur S Leonard
*Assistant Examiner* — Joseph Paul Miano
(74) *Attorney, Agent, or Firm* — Jeffrey N. Townes; Cozen O'Connor (57) ABSTRACT

The present invention refers to micro-fragmented fat or a composition comprising micro-fragmented fat for use in the treatment of a systemic disease, preferably associated to or caused by sepsis. Moreover, the micro-fragmented fat or the composition comprising micro-fragmented fat is used for treating a systemic, inflammatory, immune, or chronic disease, said disease being intended as a consequence of septic disease. Preferably, the micro-fragmented fat is useful for treating both the acute (early) and late stages of sepsis.

9 Claims, 6 Drawing Sheets

FAT AND MEDICAL USES THEREOF

CROSS-REFERENCE TO RELATED APPLICATIONS

This application is a 371 National Stage application of International PCT Application No. PCT/IB2017/052792, filed May 12, 2017, and claims priority to Italian Patent Application No. 102016000049360, filed May 13, 2016, both of which are incorporated herein by reference in their entirety.

TECHNICAL FIELD

The present invention refers to micro-fragmented fat tissue or a composition comprising micro-fragmented fat tissue for use in the treatment of a systemic disease, preferably associated to or caused by sepsis.

Moreover, the micro-fragmented fat tissue or the composition comprising micro-fragmented fat tissue is used for treating a systemic, inflammatory, immune, or chronic disease, said disease being intended as a consequence of septic disease.

Preferably, the micro-fragmented fat tissue is useful for treating both the acute (early) and late stages of sepsis.

BACKGROUND ART

Sepsis, or systemic inflammatory response syndrome, is defined as a syndrome of physiologic, pathologic, and biochemical abnormalities induced by an infection resulting in a systemic uncontrolled inflammatory response that leads to vascular leakage, tissue damage, multiorgan failure. Still currently, sepsis precipitates in 30% to 40% of cases to death since the available treatments are not very effective.

Sepsis has been reported to cause death in more than 200,000 people annually in the USA.

Therefore, sepsis significantly adds to the overall cost of healthcare.

Nowadays, although the management of septic patients is getting better and better, sepsis-related morbidity is increasing. For example, in half of the cases, the status of surviving patients are complicated by acquired neuromyopathy, and patients can face long-term disability due to muscle weakness and wasting, energetic dysfunction and proteolysis.

The detrimental effects associated with sepsis are partially due to the uncontrolled cytokine storm that damages tissues and organs. Moreover, the widespread activation of inflammation pathways progresses to multiple organ dysfunctions, collapse of the circulatory system and eventually death.

In view of all the considerations reported above, it is still strongly felt the need of developing a new/alternative cure for treating these kind of systemic disorders, with particular reference to sepsis.

SUMMARY OF THE INVENTION

The present invention solves the need above reported by using/administering micro-fragmented fat tissue, preferably by intraperitoneal route.

Indeed, the Applicant has surprisingly found that, for example, septic individuals treated with micro-fragmented fat tissue show a decrease of most of the detrimental effects associated to or caused by sepsis. More interestingly, the use/administration of micro-fragmented fat tissue recovered the impairments typical of both acute and late phases of sepsis.

The use/administration of micro-fragmented fat tissue is particularly effective in rescuing the long-term effects associated to sepsis such as, organ dysfunctions and/or injury, muscle weakness or cognitive impairment.

Indeed, the Applicant has observed an improvement of the survival rate and a lasting decrease of septic score in mice treated with micro-fragmented fat tissue. Moreover, the treated mice showed the normalization of body temperature and biological parameters, a decrease of pro-inflammatory cytokine levels and an increase of anti-inflammatory cytokine levels. Further, treated mice also showed a decreased infiltration of immune cells in the liver and lungs. Finally, micro-fragmented fat tissue administration allows recovering of neuromyopathy and muscle weakness/wasting associated to late phase of sepsis.

DETAILED DESCRIPTION OF PREFERRED EMBODIMENTS OF THE INVENTION

A first aspect of the present invention refers to micro-fragmented fat tissue or a composition comprising micro-fragmented fat tissue for use in the treatment of a systemic disease or a systemic condition, preferably a systemic disease or a systemic condition associated with or caused by sepsis.

In other words, according to the present invention, the micro-fragmented fat tissue is useful to improve (to recover and/or to rescue) the detrimental health effects associated with a systemic disease or systemic condition, preferably associated with or caused by sepsis, preferably the long term effects associated to or caused by sepsis.

Therefore, a first aspect of the present invention refers to a method for treating a systemic condition or a systemic disease, preferably a disease/condition associated with or caused by sepsis, said method comprising at least one step of administering to an individual in need thereof an effective amount of micro-fragmented fat tissue or a composition comprising micro-fragmented fat tissue.

The disease or condition is preferably a systemic, inflammatory, immune, or chronic disease/condition, said disease/condition being intended caused by a septic disease/condition.

According to a preferred embodiment, the disease or the condition is related to prostaglandin synthesis and/or non-COX targets. Therefore, the condition or disease is non-COX targets mediated.

In other words, it does not involve COX, preferably COX-2 pathway. Indeed, inhibitors of these enzymes do not impair the therapeutic effects of the present invention.

In this contest, systemic condition or systemic disease is defined as a condition or a disease affecting a number of organs and tissues, or even the body as a whole.

I this context, sepsis means also a systemic inflammatory response syndrome.

In this contest, sepsis or systemic inflammatory response syndrome means an infection resulting in systemic uncontrolled inflammatory response leading to vascular leakage, tissue damage and/or multiorgan failure. In particular, during the late phases of sepsis, these effects can cause neuromyopathy, muscle weakness, energetic dysfunction, proteolysis, muscle wasting and, in the end, even the death of septic individual.

In this context, the detrimental health effects related to sepsis are preferably selected from: neuromyopathy, energetic dysfunction, proteolysis, muscle wasting, acute kidney and liver injury, multiple organ dysfunction, and possibly death.

Preferably, the acute phase damaging effects are selected from: change in body temperature, cytokine storm (huge and rapid increase) and PCT (Pro-calcitonin) increase.

The late phase detrimental effects (or long term effects of sepsis) are preferably selected from: organ dysfunctions and/or injury, acute lung injury, shock, renal failure, muscle loss and/or weakness, cognitive impairment (insomnia, nightmares, vivid hallucinations and panic attacks, extreme fatigue, poor concentration, decreased mental functioning, loss of self-esteem and self-belief), and multiple organ dysfunction syndrome (MODS).

Preferably, the micro-fragmented fat tissue is non-enzymatic micro-fragmented fat tissue. In other words, the fat used/administered in the present invention has been microfragmented without any enzymatic treatment.

According to a further preferred embodiment of the present invention, the micro-fragmented fat tissue, preferably lipoaspirate, is obtained by using the Lipogems® device, a device composed of at least one washing and separating container having a washing chamber for washing the liposuctioned material, which container has an inlet and an outlet for the liposuctioned material to enter the washing chamber through the inlet and for at least part of said material, particularly the fluid component, to exit said chamber through the outlet, said washing chamber including means for mechanically forming an emulsion of fluid components, more preferably according to the process as fully disclosed in the patent application WO2011/145075.

Preferably, the isolated fat is introduced in the Lipogems® device and it is progressively reduced (fragmented) in small clusters of tissue by means of mild mechanical forces and in presence of a solution, preferably a saline solution.

Preferably, the micro-fragmented fat contains clusters of fat having size ranging from 50 to 5000 μm, preferably from 100 to 3000 μm, more preferably from 200 to 2500 μm, more preferably from 300 to 1500 μm, more preferably from 400 to 900 μm.

More preferably, these clusters of fat comprise Mesenchymal Stem Cells (MSCs) and/or pericytes, preferably pericytes-associated MSCs and/or Adipose Stem Cells and/or endothelial cells and/or fibroblasts and/or adipocytes. These cells into the fat clusters maintain their niche, meaning that the cells maintain their natural/intact stromal vascular niche. Therefore, advantageously these cells are supported in trophic and/or signaling terms by the stroma. Moreover, they are protected during grafting from aggressive environments and from any physical and chemical outside aggressions (such as mechanical, oxygen, ecc).

According to a preferred embodiment of the invention, the micro-fragmented fat tissue, preferably the microfragmented lipoaspirate has higher content of microvessels, preferably higher content of CD31+ cells, more preferably at 5-10 times higher content of CD31+ cells, compared to the non micro-fragmented tissue, that is the fat tissue, preferably lipoaspirate that did not undergo to the microfragmentation process disclosed in the present application and in the patent application WO2011/145075.

According to a further preferred embodiment of the invention, the micro-fragmented fat tissue, preferably the microfragmented lipoaspirate has higher content of larger vessels and/or number of pericytes, thai is NG2 positive cells, compared to the non micro-fragmented tissue, that is the fat tissue, preferably lipoaspirate that did not undergo to the microfragmentation process disclosed in the present application and in the patent application WO2011/145075.

Therefore, the micro-fragmented fat tissue, preferably the microfragmented lipoaspirate of the present invention preferably comprises:
Clusters of tissue having size ranging from 50 to 5000 μm; and/or
Mesenchymal Stem Cells (MSCs) and/or pericytes, preferably pericytes-associated MSCs and/or Adipose Stem Cells and/or endothelial cells and/or fibroblasts and/or adipocytes; and/or
It is preferably free from blood residues and pro-inflammatory oily substances.

These cells, preferably the Adipose Mesenchymal Stem Cells, express at least one, preferably all, marker selected from: CD44, CD73, CD90, CD105, CD146 and CD166 and preferably also at least one marker, more preferably all, selected from OCT4, SOX2, NANOG, b-tubulin III NESTIN, NEUROD1, MUSASHI1, PAX6, and SOX3. More preferably, these cells co-express nestin, b-tubulin III, GFAP, and O4.

Controlled fat fragmentation is allowed by using one or more fragmentation/disaggregation means contained into the device.

Preferably, the means are metallic means, more preferably metallic beads, wherein said beads have preferably size ranging from 0.1-30 millimeters, preferably 1-20 mm, more preferably 5-10 mm, more preferably 7.5-8.5 mm.

The controlled shaking of the device allows mild movements of the fragmentation/disgregation means throughout the fat tissue and therefore a gentle fat fragmentation/disgregation.

Preferably, the fragmentation/disgregation is performed in flowing saline buffer, more preferably continuous flow of saline buffer allowing oil and blood residues removal.

The fat fragmentation/disgregation step takes preferably 15-20 minutes. Therefore, the micro-fragmented fat tissue of the present invention is obtained by using a gentle, enzyme-free, sterile, intra-operative and rapid manipulation.

The fat tissue of the present invention is preferably of human origin.

According to a preferred embodiment, the fat tissue is human adipose tissue, more preferably human adipose tissue, more preferably isolated/lipoaspirate from the lower and/or the lateral abdomen area of an individual.

However, said fat tissue can be isolated from any useful body area.

Preferably, the fat tissue, preferably the micro-fragmented fat tissue is autologous or heterologous.

According to a preferred embodiment of the invention, the individual affected by sepsis is a human being.

According to a further preferred embodiment of the invention, the sepsis is hospital acquired or it is associated with a bacterial, fungal or vital infection.

Preferably, the sepsis condition/disease according to the present invention involves the mis-regulation of pro-inflammatory molecules said molecules being preferably selected from but not limited to: IL-1a, IL-1b, IL-2, IL-5, IL-6, IL-12, IL-17, GM-CSF, IFN-g, MIP-1a, MIP-1b, RANTES, pro-calcitonin (PCT) molecule and creatine kinase (CK) and TNF-a.

Preferably, the sepsis condition/disease according to the present invention involves the mis-regulation of anti-inflammatory molecules said molecules being preferably selected from but not limited to: IL-4, IL-10, IL-13 and G-CSF.

Indeed, after micro-fragmented fat administration in septic individual the anti-inflammatory molecules are up-regulated, while the pro-inflammatory molecules are down-regulated.

Therefore, the micro-fragmented fat can be used/administered for decreasing pro-inflammatory molecules, preferably selected from but not limited to: IL-1 a, IL-1b, IL-2, IL-5, IL-6, IL-12, IL-17, GM-CSF, IFN-g, MIP-1 a, MIP-1b, RANTES and/or for increasing anti-inflammatory molecules, preferably selected from: IL-4, IL-10, IL-13 and G-CSF.

According to a preferred embodiment of the invention, the micro-fragmented fat for use in the treatment of a systemic disease or condition, preferably sepsis or a condition associated with (caused by) sepsis is for intraperitoneal, intramuscular, alveolar, nasal, pulmonary, intrathecal, via cribriform plate (lamina cribra), preferably using nasal route, or lymphatic administration. The most preferred administration route is intraperitoneal route. Preferably, the micro-fragmented fat tissue or the composition comprising the micro-fragmented fat tissue is administered as such or in combination with further molecules, preferably anti-inflammatory and/or antibiotic agents.

According to a preferred embodiment, the administration is associated with or it follows further treatments:
Surgery at the site of infection; and/or
Reequilibration of hemodynamics, preferably by injection of electrolytes; and/or
Cardiotropes and/or vasoactives (such as catecholamines) molecule administration, and/or
Corticotherapy, preferably at low dose; and/or
Respiratory, preferably helped by ventilation; and/or
Hemodialysis and/or insulin therapy, and/or
Blood transfusion.

Preferably, the use/administration takes place within the first 6 hours (called the golden hours in the medical community) from when sepsis symptoms appear according to the current clinical practice dosage. Alternatively, the use/administration takes place few days and/or weeks after sepsis symptoms have appeared.

EXAMPLE

Mice and Housing Conditions

All protocols were reviewed by the Institut Pasteur, the competent authority, for compliance with the French and European regulations on Animal Welfare and with Public Health Service recommendations.

The mice used were 6 to 10 weeks old C57Bl/6RJRJ males. Mice were euthanized if the inflammatory score at any given time point was greater than 21, or if the points ascribed to respiratory rate or quality increased by more than $3^{22}$. Unless specified, for every experiment the total number of animals used was 5 for the non CLP controls, 7 for the experimental points CLP and 7 for the CLP+Lipogems® group. The experiments were always repeated twice independently. For the LPS challenge, we used n=4 animals for control, n=8 animals for LPS and n=8 animals for the LPS+Lipogems® group. Mice were housed on a 12:12 light/dark cycle in a pathogen free facility with controlled temperature and humidity. Food and drink were given ad libitum. The ARRIVE guidelines for the good practice experimental studies were followed throughout.

Caecal Ligation and Puncture (CLP) and Lipopolysaccharide (LPS) Infections

We used two models of septic mice in the present study:
1. The Caecal Ligation and Puncture[20] (CLP) Model.

It consisted of a peritonitis induced by CLP as a model of inflammation in males, 6 to 10 weeks old C57Bl/6RJRJ. The CLP model consists of the perforation of the caecum allowing the release of faecal material into the peritoneal cavity to generate an exacerbated immune response induced by polymicrobial infection. Mice that undergo CLP with fluid resuscitation show the first (early) hyperdynamic phase that in time progresses to the second (late) hypodynamic phase. Animals were anesthetized with ketamine (Imalgene1000 100 mg/Kg Merial) and Xylazine (Rompun 2% 20 mg/Kg Bayer) ip prior to surgery. After laparotomy, caecum was ligatured at the distal third with a 4.0 suture and the distal part was perforated twice with a 21 Gauge needle. All groups of mice were hydrated and treated with analgesic (Buprenorphin Axience 0.3 mg/kg) twice a day for 4 d following surgery.

2. LPS Administration.

LPS was administered intraperitoneally to reach 10 mg/Kg, from a 10 mg/ml stock solution stored in 0.9% NaCl corrected according to the mice weight. This group was performed to confirm the effect of Lipogems® on the primary objectives (inflammatory score and survival rate) only.

In both models, control animals were only anesthetized with ketamine (Imalgene1000 100 mg/Kg Merial) and Xylazine (Rompun 2% 20 mg/Kg Bayer) ip at the same doses. All surgical procedures were carried out during the morning under a sterile hood.

Lipogems® Harvesting

Each patient signed an informed consent of no objection for the use for research of surgical tissues (otherwise destined for destruction). Patients' data were collected on a prospectively held database, set up after the French National Authority for Personal Data Protection approval (Commission Nationale Informatique et liberté: CNIL. https://www.cnil.fr. Registration number 1922081-02.02.2016)

Harvesting of human adipose tissue

The lower or the lateral abdomen areas were chosen as donor sites for adipose tissue harvesting using a technique derived from traditional surgical liposuction. A blunt 13G cannula with multiple elliptical holes of 1×2 mm distributed along it was employed for adipose tissue harvesting. This disposable cannula, connected with a 10 cc syringe, allows a fast and atraumatic harvesting of adipose tissue with few cannula strokes. Adipose tissue was harvested 10 minutes after tumescent infiltration with saline and 1:1000 epinephrin from the selected area.

Processing of adipose tissue with Lipogems® device

The harvested adipose tissue was immediately processed in the Lipogems® closed system. The mechanical processes of micro-fragmentation, wash, and filtration take place in a system completely immersed in physiological solution avoiding the presence of air, in order to make possible the reduction in volume and minimize any traumatic action on cellular products. The resulting product contains pericytes/MSCs retained within an intact stromal vascular niche, being ready to interact with the recipient tissue after transplantation. The purified Lipogems® adipose tissue was collected in a 60 cc syringe and positioned to gently decant by gravity in order to remove excessive saline solution. Then the Lipogems® product was transferred in several 1 cc syringes to be reinjected intraperitoneally in the recipient mouse.

Cyclooxygenase Inhibitors

Mice subjected to injections of cyclooxygenase inhibitors where injected intraperitoneally at the time of Lipogems® delivery. Injections were performed either with Indomethacin (a nonselective inhibitor of COX enzymes used at 10 mg/kg; Sigma-Aldrich, 17378, USA), or SC-560 (a selective inhibitor of the COX1, used at 6 mg/kg; Sigma-Aldrich, S2064, USA) or with NS-398 (a selective inhibitor of the COX2 used at 6 mg/Kg; Sigma-Aldrich, N194, USA). Injections were performed every 8 hours for 24 hours. All injections were body weight corrected, starting from a 10 mg/ml solution prepared fresh before injections in 0.9% NaCl. The control group was injected with the same volumes of 0.9% NaCl. For this set of experiment, we used n=8 septic CLP mice, n=8 septic CLP+Lipogems® mice and n=5 controls (non-septic non injected mice). Independent experiments were repeated twice.

Luminex® (Multiplex Immunoassay)

Blood was collected from intra cardiac puncture in heparin coated Eppendorf tube and syringe. The blood was spun at 1500 rpm at 4° C. for 10 minutes and the supernatant (plasma) was collected and frozen. Frozen plasma was thawed and processed for Luminex® multiple cytokine and chemokine analysis (Bio-Plex® Pro™ Mouse Cytokine Standard 23-flex, Group I and Standard 9-flex, Group II). The study of inflammatory cytokines was conducted on control, septic (CLP), septic mice injected with Lipogems®. For this set of experiments, we used n=7 septic CLP mice, n=7 septic CLP+$^{Lipogems}$® mice and n=5 controls (non-septic non injected mice).

Hematoxylin and Eosin (H&E) Staining and Immunohistochemistry

For H&E analyses, organs were fixed in 4% formaldehyde for 2 days, and embedded in paraffin at 60° C. Tissues were then sectioned at 50 μm and left overnight dry. Sections were dipped in hematoxylin for 30 seconds. After being washed with alcohol acid and ammonia water, they were immersed in eosin for 15 seconds. After each step, sections were rinsed with distilled water. The sections then were dehydrated by treatment with alcohols of increasing concentrations (70%, 80%, 95%, and 100%). Finally, the sections were treated with xylene and covered with glass slips. For the immunostaining, standard techniques were used to prepare frozen serial 10-μm sections. All tissues were fixed with paraformaldehyde 4% for 15 minutes and washed with PBS. The tissues were then incubated 30 minutes with 0.5% TritonX100 and 3% BSA (Bovine Serum Albumine) in PBS. After extensive wash, primaries antibodies were incubated in PBS at 37° C. for 1 hour. The sections then were washed with PBS and exposed to the secondary antibodies (Histofine, simple stain Max PO peroxidase polymer directed against the correct host for 50 minutes at room temperature Negative controls (staining without the primary antibody) were performed concurrently with all immunohistochemical staining. For histology count we used n=4 controls, n=5 septic mice (CLP) or n=5 septic (CLP)+Lipogems® injected. The count was done manually in double blind. The list of antibodies used was the following: anti-CD3, Dako # A0452; anti-CD4 Pharmigen #550280; anti-F4/80 Invitrogen # RM2600; anti-CD45R (B220) Invitrogen # A14748; anti-biotinylated Jackson #712065150.

Measurements.

Primary Endpoint.

The primary endpoint was the evaluation of the inflammatory score 24 hours after CLP (table 1). For comparative and confirmation purpose, this score was also calculated at 24 hours in mice injected with 10 mg/kg ip LPS.

Secondary Endpoint.

The measured secondary endpoints included survival and body temperature until day 21 post-inflammation, plasma levels of aspartate aminotransferase (ASAT), alanine aminotransferase (ALAT), alkaline phosphatase (AP), lactate deshydrogenase (LDH) and creatine kinase (CK) leucocyte count, and plasma levels of pro- and anti-inflammatory cytokines at 24 hours and until the $21^{st}$ day post CLP, the number of F4/80+, B220+ and CD3+ cells in the liver and kidney 6 hours post CLP.

Data Analysis

The sample size was based on previous experiments and the minimal n value to obtain significant results. We previously observed an important difference with low variability after injection of bone marrow mesenchymal stem cells on animal death. We have 65% of death after induction of high grade CLP and it drops to 5% after injection of bone marrow mesenchymal stem cells. With $\alpha=5\%$ and a power of 90% we end up with n value=7. We have evidences (experimental like a higher drop of cytokines observed with adipose versus bone marrow derived mesenchymal stem cells in the lab and literature based) that adipose derived mesenchymal stem cells will be more efficient than bone marrow derived mesenchymal stem cells. Thus n=8 should be sufficient. For each condition, data are represented as median[IQR], except for body temperature, quantity of cytokines and leucocyte count that are displayed with mean±SD. *P<0.05; P<0.01; *P<0.001; ns, statistically non-significant, compared to the respective control.

Data analysis was performed either simple blind (sepsis score, body temperature, Luminex) or double blind (clinical biology, histology). Statistical analysis was performed using GraphPad Prism software using appropriate tests (non-parametric Mann-Whitney unless specified) and a minimum of 95% confidence interval for significance; P values indicated on figures are <0.05 (*), <0.01(), and <0.001 (*). Figures display median of all animals tested±confidence interval or as specifically indicated for the other experiments. All animals were included in the analysis.

Effects of Lipogems® on the Inflammatory Response in Septic Mice.

Primary Endpoint.

First, we looked at the inflammatory score 24 hours after either CLP or intraperitoneally injection of LPS.

Figure 1:
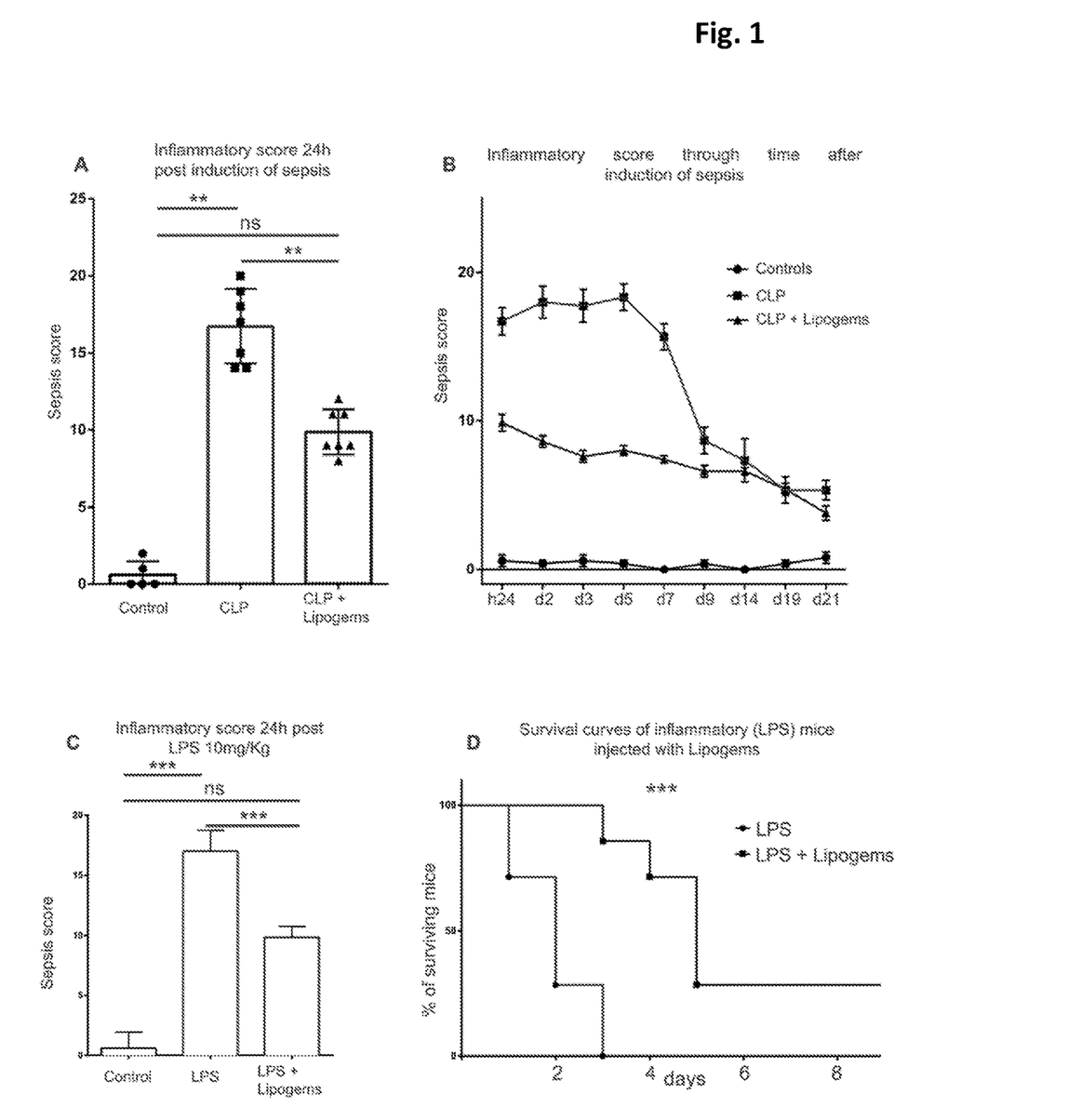
FIG. 1 shows the sepsis score in CLP mice injected with Lipogems (micro-fragmented fat tissue) or saline (A-B), and the sepsis score and the survival rate in LPS-treated mice injected or not with Lipogems (micro-fragmented fat tissue) (C-D).

We observed a significant decrease of the sepsis score in CLP mice injected with Lipogems® (9[8-12]; p=0.006) compared to CLP mice injected with saline (17[14-20] FIG. 1A). The inflammatory score remained high in CLP mice injected with saline for 5 days (around 16) and decreased sharply between day 7 and day 9 post-induction of sepsis. The score reached 7[5-9] at day 21 post-induction of sepsis in the group of septic mice injected with saline (FIG. 1B). Twenty-one days after induction of sepsis, the inflammatory score of the septic group injected with Lipogems® was at 3[2-5], lower than in the septic untreated control or septic injected with saline 5[3-6] (p=0.03; FIG. 1B).

Second, we looked at the inflammatory score at 24 hours post-inflammation in LPS-treated mice. Twenty-four hours after injection of LPS the inflammatory score reached 16[15-20] in the inflammatory mice (injected with LPS only) vs. 10[9-11] in the inflammatory mice injected with Lipogems® (p=0.0006, FIG. 1C). Mice challenged with LPS reached the limits (defined has an inflammatory score of 21) within 2 days (median survival) (FIG. 1C,D).

Secondary Endpoint.

Figure 2:
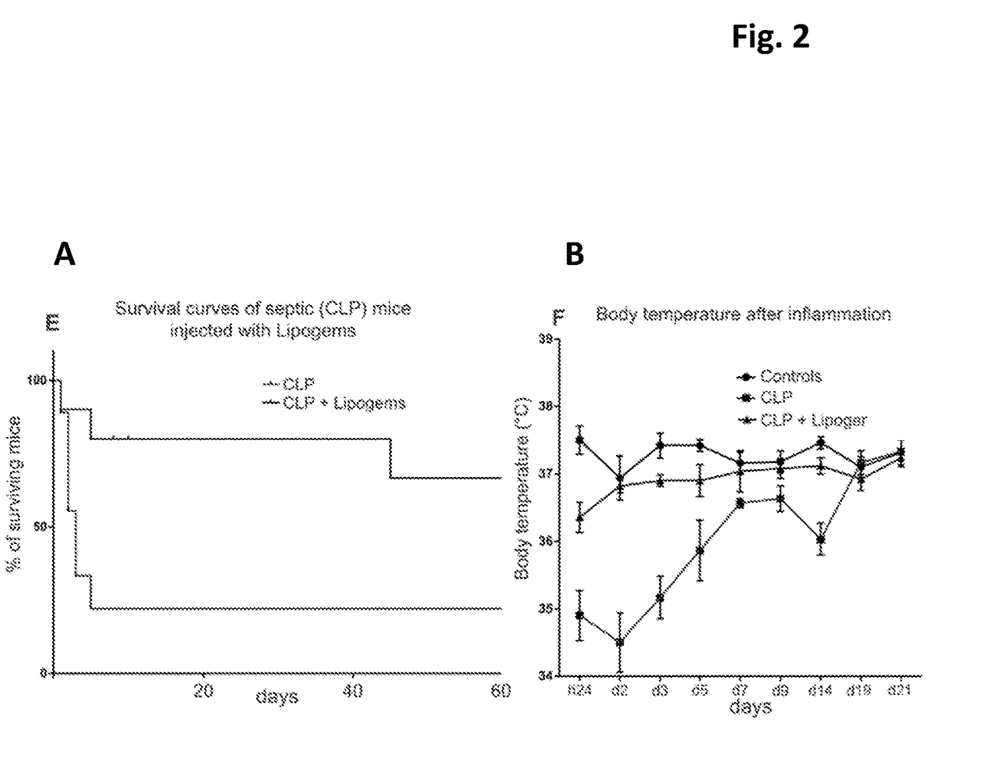
FIG. 2 shows the survival rate (A) and the body temperature (B) of CLP mice injected with saline or Lipogems (micro-fragmented fat tissue).

There was a statistically significant improvement in survival rate of mice intraperitoneally injected with Lipogems® compared to septic mice injected with saline (65% vs. 25% survivors, 60 days after induction of the inflammation p=0.03; FIG. 2A). CLP mice injected with Lipogems® have higher temperatures and smaller drop in their body temperature compared to septic mice injected with saline (36.3±0.6° C. vs. 34.9±0.98° C. respectively) 24 hours after the induction of inflammation, P=0.004, FIG. 2B). The difference in body temperature holded until day 14 post inflammation. At day 19 post inflammation, the body temperature of both groups returned to normal values (37.2±0.3° C. for control vs. 36.9±0.38° C. for CLP and CLP injected with Lipogems®, p=0.34, FIG. 2B).

Survival rate of mice injected with Lipogems® 48 hours post-inflammation was 71% (5 out 7 animals and their median survival was 5[3-6] days (median survival) FIG. 1D) vs. a median survival of only 2[1-3] days in the LPS mice injected with saline (p=0.009; FIG. 1D).

Figure 3:
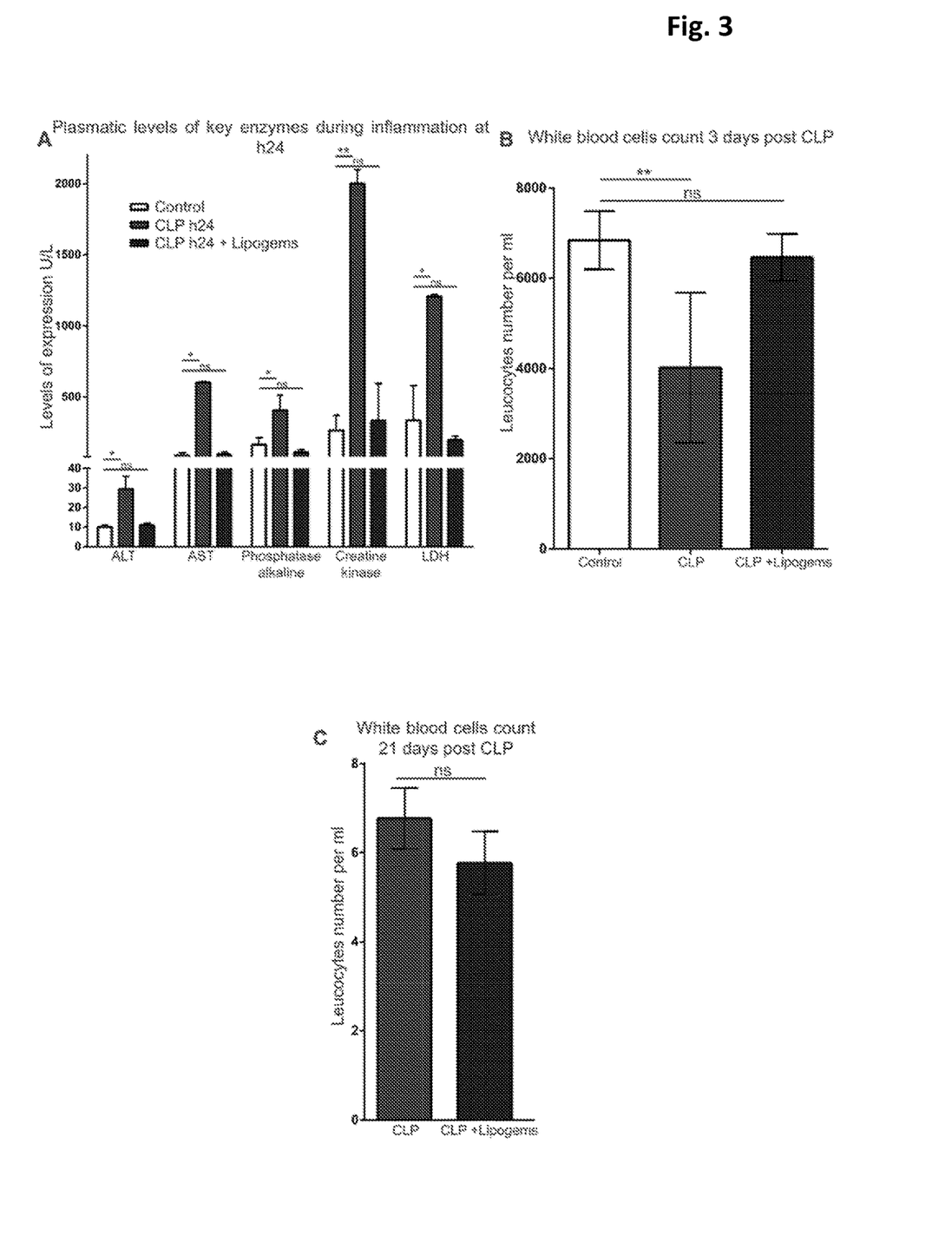
FIG. 3 shows the plasma levels (A) of alanine aminotransferase (ALT), aspartate aminotransferase (AST), alkaline phosphatase (AP), creatine kinase (CK) and lactate dehydrogenase (LDH); the leucocyte count (B-C) in CLP ice injected with saline or Lipogems (micro-fragmented fat tissue).

Plasma levels of aspartate aminotransferase (ASAT), alanine aminotransferase (ALAT), alkaline phosphatase (AP), lactate deshydrogenase (LDH) and creatine kinase (CK) were statistically higher 24 hours post inflammation in CLP mice compared to the control non-inflammatory groups (FIG. 3A). When injected with Lipogems®, the CLP mice displayed biological parameters close to control (FIG. 3A). We observed an initial drop in leukocyte count 24 hours after the CLP which was not observed when CLP mice were injected with Lipogems® (FIG. 3B, p=0.0722). No difference in leucocyte count was detected between groups in any of the tested conditions at late time points post induction of CLP (FIG. 3C, p>0.05).

Effect of Lipogems® on Cytokine Storm and Organ Immune Infiltration.

Figure 4:
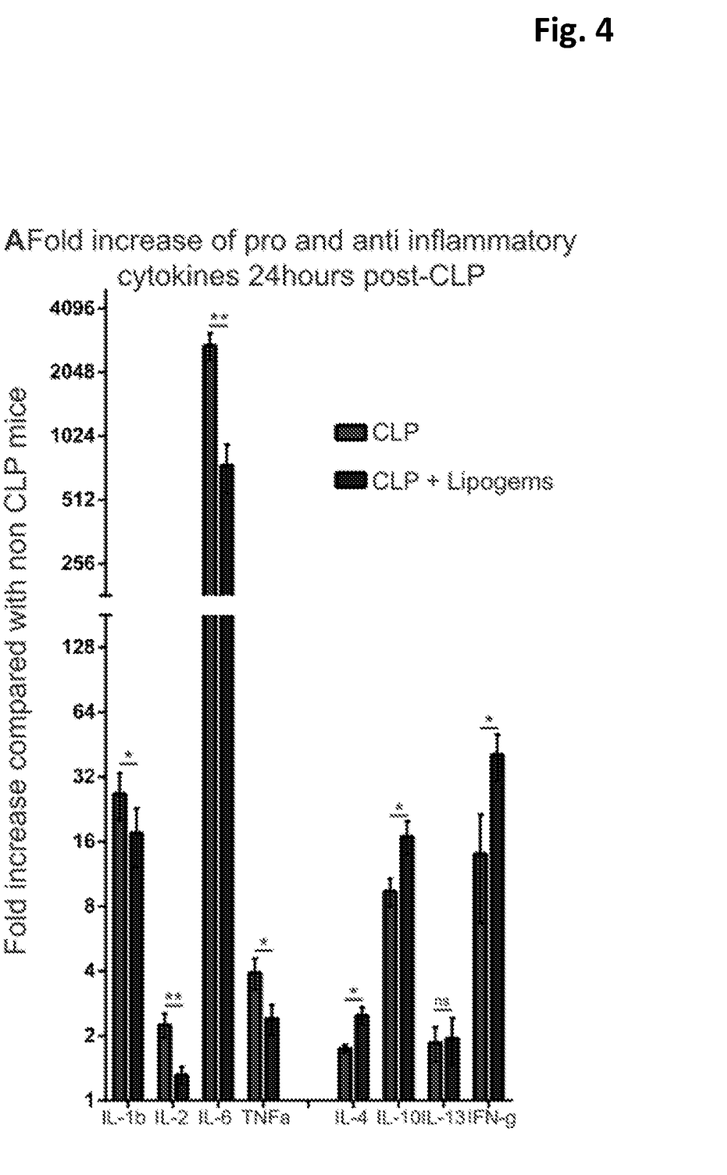
FIG. 4 shows pro-inflammatory cytokine levels In CLP mice injected or not with Lipogems (micro-fragmented fat tissue).

In the plasma of septic CLP mice, all cytokine levels were elevated 24 hours after the puncture (FIG. 3, Table I). The following pro-inflammatory cytokine levels were significantly decreased in CLP mice injected with Lipogems® compared to untreated CLP mice: IL-1a, IL-1 b, IL-2, IL-5, IL-6 IL-12, IL-17, GM-CSF, IFN-g, MIP-1a, MIP-1 b, RANTES, TNF-a (FIG. 4, Table I). Focusing on the pro-inflammatory IL-6, we observed a decrease of its levels in the septic mice injected with Lipogems® compared to untreated CLP septic mice (9139 pg/µl±4307 vs. 29628 pg/µl±6166, p=0.0079, FIG. 4, Table I). Conversely, the following anti-inflammatory cytokines were found to be increased: IL-4, IL-10, G-CSF (FIG. 4, Table I). Focusing on the anti-inflammatory IL-4, we observed a significant increase in the plasma levels of CLP mice injected with Lipogems® compared to untreated CLP mice (23.96 pg/µl±3.6 vs. 16.91 pg/µl±1.6, p=0.008, FIG. 4, Table I). Twenty-one days post-induction of sepsis no differences between untreated septic mice and septic mice injected with Lipogems® were found.

TABLE I

| | Control (saline) | Sepsis h24 (CLP) | Sepsis h24 + Lipogems |
|---|---|---|---|
| IL-1a | 29.87 ± 8.9 | 144.5 ± 22.5 | 77.01 ± 13.33 ** |
| IL-1b | 131.8 ± 96.15 | 2542 ± 475 | 1619 ± 136 ** |
| IL-2 | 11.6 ± 2.1 | 25.65 ± 2.9 | 15.81 ± 3.6 ** |
| IL-3 | 10.14 ± 4.5 | 18 ± 9.5 | 15.14 ± 3.1 ns |
| IL-4 | 9.68 ± 1.4 | 16.91 ± 1.6 | 23.96 ± 3.6 ** |
| IL-5 | 13.33 ± 4.4 | 204 ± 116 | 52.83 ± 17.7 ** |
| IL-6 | 12.6 ± 5 | 29628 ± 6166 | 9139 ± 4307 ** |
| IL-10 | 77.49 ± 45.5 | 679.5 ± 201 | 1256 ± 485 ns |
| IL-12 | 303.2 ± 252 | 8085 ± 3506 | 2364 ± 939 ** |
| IL-13 | 245.4 ± 75 | 387.7 ± 146 | 475 ± 188 ns |
| IL-17 | 16.14 ± 21.7 | 524.8 ± 288 | 149.7 ± 98.4 * |
| Eotaxin | 469.3 ± 63.44 | 4707 ± 2181 | 5067 ± 1160 ns |
| G-CSF | 78.34 ± 49.7 | 27813 ± 6620 | 46441 ± 10888 * |
| GM-CSF | 135.2 ± 22 | 346 ± 43 | 221.4 ± 69.9 ** |
| IFN-g | 13.78 ± 8.2 | 131.4 ± 103 | 476.5 ± 158 * |
| MCP-1 | 107.3 ± 90.8 | 26054 ± 20324 | 46103 ± 17760 ns |
| MIP 1a | 31.09 ± 10.1 | 1636 ± 339.2 | 1047 ± 183.5 * |
| MIP 1b | 12.97 ± 9.4 | 6066 ± 4072 | 1565 ± 1051 ** |
| RANTES | 56.96 ± 49.8 | 1913 ± 708 | 748 ± 379 * |
| TNFa | 198 ± 102 | 683.8 ± 114.1 | 420.8 ± 126 * |

Figure 5:
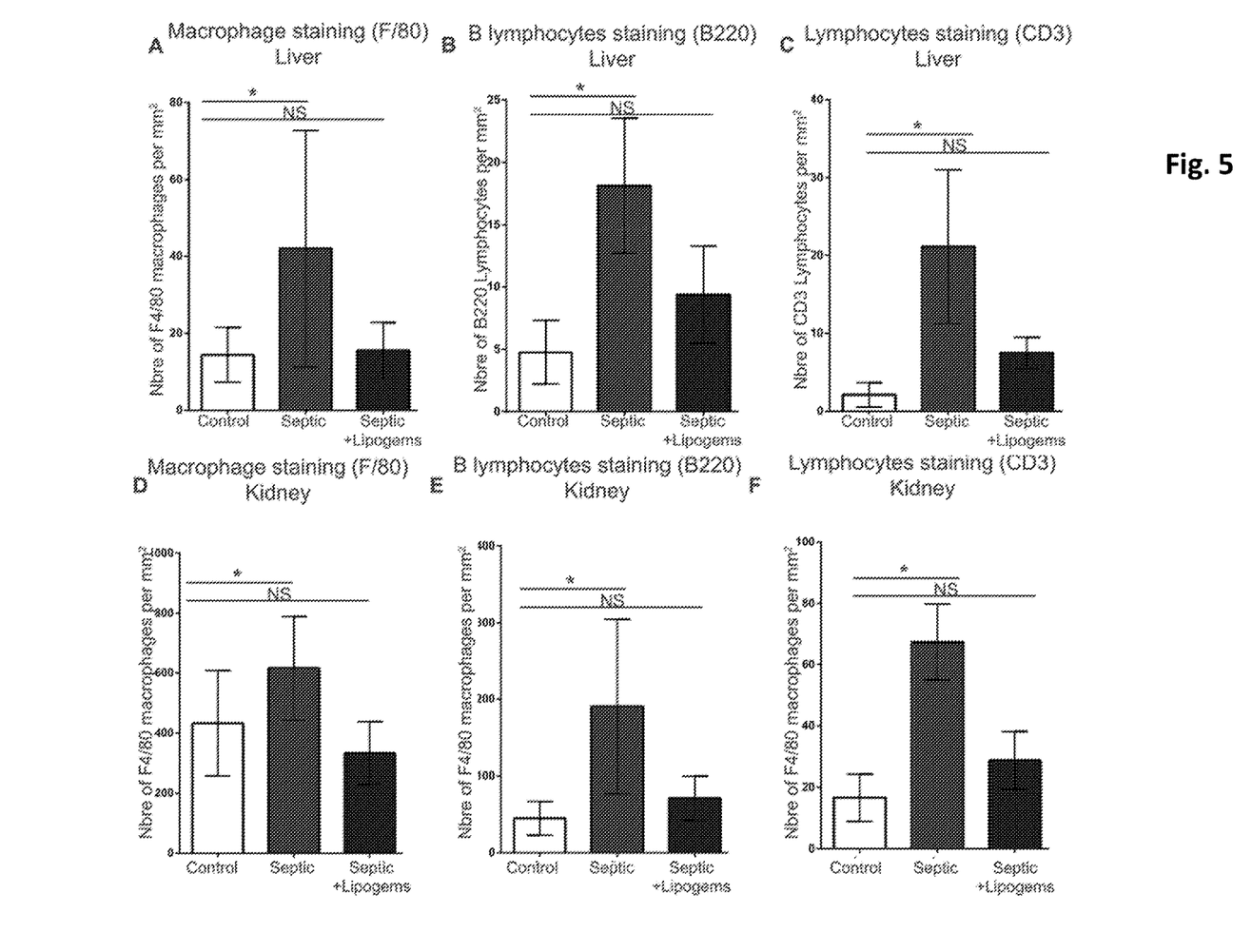
FIG. 5 shows the number of F4/80+, B220+ and CD3+ cells in the liver and kidney of CLP mice injected or not with Lipogems (micro-fragmented fat tissue).

Six days after the induction of sepsis, we also observed an increase of the number of F4/80+, B220+ and CD3+ cells in the liver of inflammatory CLP mice compared to control mice. After injection with Lipogems®, a significant decrease of the number of F4/80 (FIG. 5A, p=0.033); B220 (FIG. 5B, p=0.024); CD3 (FIG. 5C; p=0.035) was observed compared to untreated CLP mice. The kidney also showed a global decrease of all the tested immune cell types after Lipogems® injection: F4/80 (FIG. 5D, p=0.0014); B220 (FIG. 5E p=0.05); CD3 (FIG. 5F, p=0.03). No detectable Gr1 positive cells were found after inflammation when comparing the control with inflammatory animals and we have thus decided not to include these markers in our analysis.

Effect of Cyclo-Oxygenase Inhibitors on Lipogems® Effects 24 Hrs Post-CLP.

Figure 6:
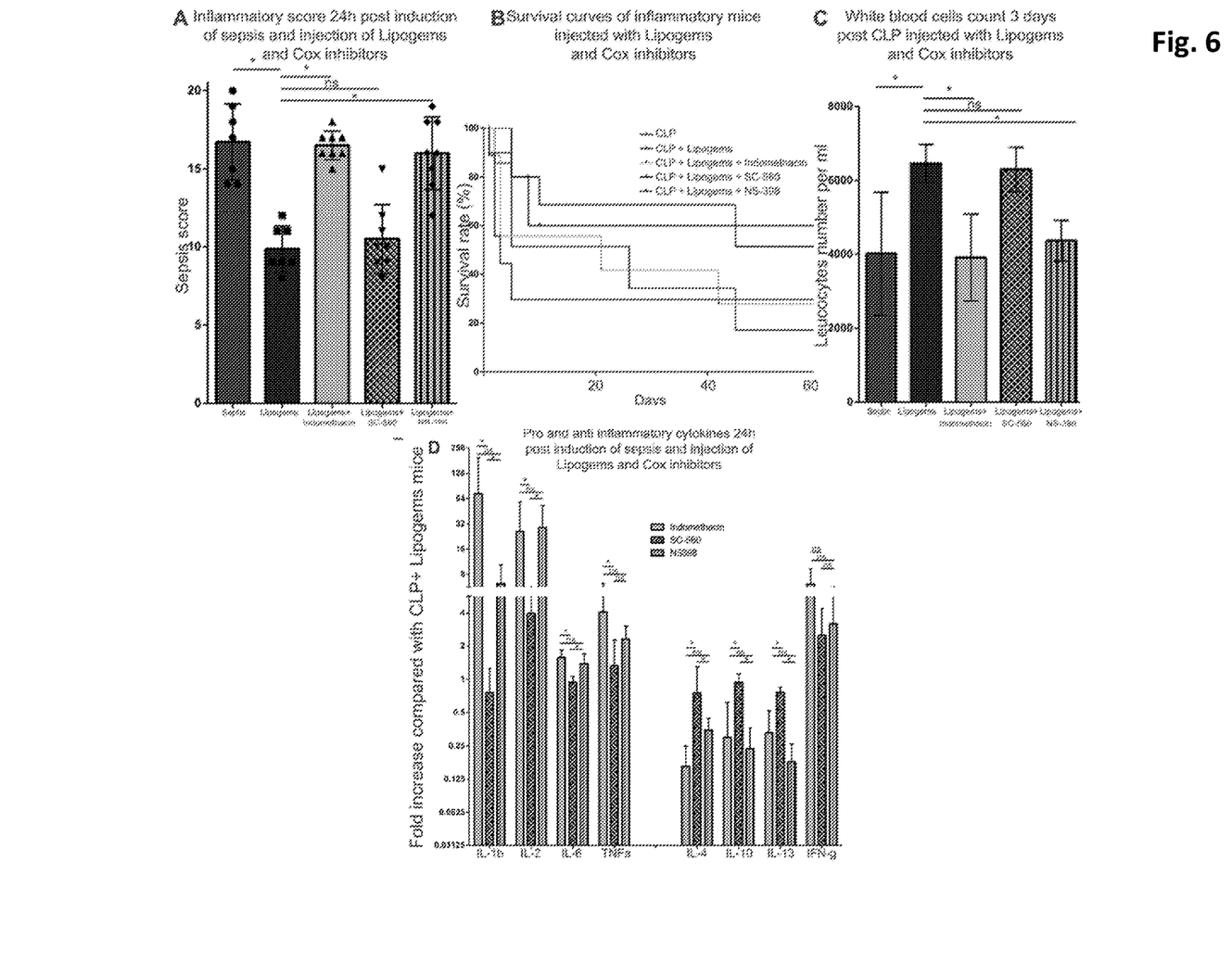
FIG. 6 shows the inflammatory score (A), the survival rate (B), the leucocyte count (C), and the pro-inflammatory cytokines levels (D) of CLP mice injected with Lipogems, Lipogems+Indomethacin, Lipogems+SC-560 and Lipogems+LS-398 (Lipogems=micro-fragmented fat tissue).

To understand whether Lipogems® effect was mediated via the COX pathway, we repeated the previous protocol co-administering selected COX inhibitors. In details, we induced inflammation by CLP and injected Lipogems® 2 hours after the induction of sepsis and sacrificed the mice 24 hours post-CLP. We found that the inflammatory score was not changed 24 hours after injection with Lipogems® plus indomethacin or Lipogems® plus NS-398 (inflammatory score=16.50[15-18]; p=0.001 and 16.00[12-19] p=0.001, respectively) compared to septic untreated mice (FIG. 6A). However the effects of Lipogems® were not impacted after the co-injection with SC-560 (inflammatory score: 10[8-15] Lipogems® plus SC-560 vs. 9[8-12] Lipogems® alone; p=0.65 FIG. 6A). A lower survival rate was observed when Lipogems® was co-injected with either indomethacin (median survival rate of 26[22-29] days; p=0.12) or NS-398 (median survival rate 21[18-24] days; p=0.09). No statistical difference was detected when animals were injected with Lipogems® alone or Lipogems® plus SC-560 (median survival rate of 60[55-67] days; p=0.04, FIG. 6B). The leucocyte count dropped 3 days post-CLP when co-injecting Lipogems® plus either indomethacin (3986±1172 leucocytes per ml; p=0.02) or NS-398 (4068±551 leucocytes per ml, p=0.01) compared to Lipogems® injection alone (6307±516 leucocytes per ml, FIG. 6C). No difference in leucocyte count was observed when co-injecting Lipogems® with SC-560 (6025±597 leucocytes per ml, p=0.095 FIG. 6C). Plasma levels of the pro-inflammatory cytokines IL-1, IL-2, IL-5, IL-6, IL-17, IFN-g, MIP-1, TNF-α were augmented when septic (CLP) mice were injected with Lipogems® plus indomethacin (FIG. 6D, Table II) compared to Lipogems® alone. For example, IL-6 level was 9151 pg/µl±897 in the plasma of inflammatory mice injected with Lipogems® vs. 14225 pg/µl±1078 in inflammatory mice injected with Lipogems® plus indomethacin (p=0.028, FIG. 6D, Table II). When using the specific cyclooxygenase-1 inhibitor SC-560, only IL-17 plasma level was increased, whilst all the other pro-inflammatory cytokines were not changed compared to CLP mice injected with Lipogems® alone (Table II). For example, IL-6 had a concentration of 8548 pg/µl±971, not different from the 9151 pg/µl±897 of the Lipogems® injected inflammatory mice (p=0.48, Table II).

Analogous results when injecting Lipogems® plus NS-398 a selective cyclooxygenase-2 inhibitor: IL-1, IL-2, IL-6, IL-17, TNF-a plasma levels increased 24 hours post CLP when compared with the group post-CLP and injected with Lipogems® alone (FIG. 6D, Table II). Focusing on IL-6, 24 hours post-CLP we observed a plasma concentration of 12464 pg/µl±2346, when mice were co-injected with Lipogems® and NS-398, which was higher than the CLP and Lipogems® alone injected mice (9151 pg/µl±897; p=0.028, FIG. 6F). We detected a decrease of IL-4 and IL-10 and IL-13 plasma levels 24 hours post-CLP when inflammatory mice were injected with Lipogems® and indomethacin (FIG. 6D, Table II). Also, IL-10 plasma concentration was 2364 pg/µl±2100 when CLP and Lipogems® injected mice were co-injected with indomethacin, which was lower than the concentration observed with CLP and Lipogems® only (8839 pg/µl±1442; p=0.028, FIG. 6D, Table II). The injection of SC-560 did not change the levels of the anti-inflammatory cytokines (for IL-10 8120 pg/µl±952.2, p=0.48, FIG. 6D, Table II), yet the injection of NS-398 decreased the plasma levels of anti-inflammatory cytokines IL-4, IL-10, IL-13 (for IL-10: 2052 pg/µl±1158, p=0.03, FIG. 6D, Table II).

CONCLUSION

The data exemplified above show that intraperitoneally administration of micro-fragmented fat (Lipogems®) efficiently reduces the detrimental effects of sepsis, in particular at the acute phase.

Indeed, the data demonstrate an improvement of the survival rate of septic mice treated with micro-fragmented fat, and a lasting decrease of the sepsis score. In addition, mice body temperature is close to 37° C., the levels of pro-inflammatory cytokines decrease while the levels of anti-inflammatory cytokines increase. Further treatment of septic mice, such as Lipoaspirate intraperitoneally administration did not show the same results. Moreover, the data reported above demonstrate that Lipogems® micro-fragmented fat acts via prostaglandin pathway. In particular, the enzymatic activity of COX-2 is critical for its anti-inflammatory effect. Indeed, indomethacin (a potent prostaglandin synthesis suppressor) administration blocks the effects of Lipogems® micro-fragmented fat administration in septic mice. Therefore, Lipogems® micro-fragmented fat affects prostaglandin synthesis and non-COX targets.

Long Term Effects of Micro-Fragmented Fat Tissue Injection into Septic Mice

Micro-fragmented fat with Lipogems extraction was shown to diminish the inflammation during acute phase of sepsis. One of the long-term effect of sepsis can be 1) muscle weakness that can last for 5 years and 2) cognitive impairment. We have experimentally demonstrated that when Lipogems (micro-fragmented fat tissue) is injected into mice a few days after induction of sepsis, the microglial cells—the immune cells of the brain—are less impaired. In particular, Lipogems injection reduces the microglial cells deramification in the frontal cortex and hippocampus of septic mice and therefore Lipogems injection at the chronic phase of sepsis improves microglial cells behavior.

In conclusion, we shown that micro-fragmented fat injection prevents or ameliorates/reduces the cognitive impairment associated to/caused by sepsis.

Moreover, we measured the number of Pax7+ cells and we found a decrease of satellite cells in the septic mice after late administration of Lipogems.

The invention claimed is:

1. A method of treating an individual suffering from acute phase sepsis, comprising a step of administering a compo-

TABLE II

|         | Sepsis h24 + Lipogems | Sepsis h24 + Lipogems + Indomethacin | Sepsis h24 + Lipogems + SC-560 | Sepsis h24 + Lipogems + NS-398 |
|---------|-----------------------|--------------------------------------|--------------------------------|--------------------------------|
| IL-1a   | 422.1 ± 188           | 6788 ± 8234 *                        | 475.8 ± 193 ns                 | 10495 ± 3695 *                 |
| IL-1b   | 585.4 ± 336           | 16546 ± 16711 *                      | 332 ± 199 ns                   | 2845 ± 1415 *                  |
| IL-2    | 492.4 ± 219           | 8535 ± 7453 *                        | 1737 ± 621 ns                  | 10598 ± 2503 *                 |
| IL-3    | 4164 ± 996            | 3658 ± 2120                          | 4178 ± 971 ns                  | 8049 ± 1252 ns                 |
| IL-4    | 27232 ± 2168          | 4320 ± 2038 *                        | 19957 ± 14525 ns               | 9299 ± 2024 *                  |
| IL-5    | 3477 ± 1018           | 8083 ± 875 *                         | 3672 ± 2466 ns                 | 5519 ± 1132 ns                 |
| IL-6    | 9151 ± 897            | 14225 ± 1078 *                       | 8548 ± 971 ns                  | 12464 ± 2346 *                 |
| IL-10   | 8839 ± 1442           | 2364 ± 2100 *                        | 8120 ± 952 ns                  | 2052 ± 1158 *                  |
| IL-12   | 1788 ± 1243           | 5181 ± 2683 ns                       | 4308 ± 1800 ns                 | 3899 ± 2280 ns                 |
| IL-13   | 15284 ± 2847          | 4905 ± 2538 *                        | 11836 ± 3373 ns                | 2711 ± 1185 *                  |
| IL-17   | 4652 ± 2144           | 28917 ± 15527 ns                     | 4079 ± 1741 *                  | 14195 ± 6154 ns                |
| Eotaxin | 17223 ± 20109         | 8321 ± 4862 ns                       | 9403 ± 557 ns                  | 7418 ± 427 ns                  |
| G-CSF   | 10672 ± 7550          | 3793 ± 816 ns                        | 5749 ± 911 ns                  | 2063 ± 1221 ns                 |
| IFN-g   | 4528 ± 1830           | 24465 ± 7231 *                       | 9346 ± 3392 ns                 | 13140 ± 9227 ns                |
| MCP-1   | 4034 ± 1626           | 18650 ± 11861 ns                     | 5723 ± 2317 ns                 | 6785 ± 2252 ns                 |
| MIP 1a  | 2185 ± 341            | 5198 ± 1512 ns                       | 2189 ± 1686 ns                 | 3846 ± 538 ns                  |
| MIP 1b  | 263.7 ± 259           | 859.7 ± 111 *                        | 455.8 ± 284 ns                 | 569 ± 75 ns                    |
| RANTES  | 3727 ± 2359           | 14678 ± 1006 *                       | 3565 ± 704 ns                  | 10655 ± 1498 *                 |
| TNFa    | 4282 ± 1007           | 16016 ± 5019 *                       | 5166 ± 2422 ns                 | 9437 ± 1720 *                  | sition comprising autologous micro-fragmented fat to the individual to treat a disease associated with or caused by acute phase sepsis, wherein the autologous micro-fragmented fat contains clusters of fat having a size ranging from 200 to 900 µm;

wherein the autologous micro-fragmented fat is non-enzymatic micro-fragmented fat;

wherein the autologous micro-fragmented fat is administered in a manner selected from the group consisting of intraperitoneal, intramuscular, alveolar, nasal, pulmonary, intrathecal, and via cribriform plate (lamina cribra);

wherein acute phase sepsis is associated with detrimental health effects selected from the group consisting of change in body temperature, cytokine storm, and pro-calcitonin increase; and wherein the autologous micro-fragmented fat is derived from liposuctioned adipose tissue from the individual and wherein the liposuctioned adipose tissue is micro-fragmented, washed, and filtered in a closed-system device completely immersed in physiological solution avoiding the presence of air.

2. The method according to claim 1, wherein the disease associated with or caused by acute phase sepsis is related to prostaglandin synthesis and/or non-COX targets.

3. The method according to claim 1, wherein the autologous micro-fragmented fat contains clusters of fat comprising Mesenchymal Stem Cells (MSCs), pericytes, and/or Adipose Stem Cells (ASCs), wherein the MSCs, pericytes, and/or ASCs maintain their intact stromal vascular niche.

4. The method according to claim 1, wherein the autologous micro- fragmented fat derives from human adipose tissue.

5. The method of claim 4, wherein the autologous micro-fragmented fat derives from human adipose tissue isolated from the lower and/or the lateral abdomen of the individual.

6. The method according to claim 1, wherein the disease associated with or caused by acute phase sepsis involves mis-regulation of pro-inflammatory molecules selected from the group consisting of: IL-1la, IL-1b, IL-2, IL-5, IL-6, IL-12, IL-17, GM-CSF, IFN-g, MIP-1a, MIP-1b, RANTES, procalcitonin molecule, creatine kinase and TNF-a.

7. The method of claim 1, wherein the autologous micro-fragmented fat is obtained by progressively reducing the liposuctioned adipose tissue into clusters by means of mechanical forces and in presence of a saline solution.

8. The method of claim 1, wherein the composition comprising autologous micro-fragmented fat is administered using a nasal route.

9. The method of claim 1, wherein acute phase sepsis is associated with both a change in body temperature and cytokine storm.

* * * * *